PULSE WIDTH DISCRIMINATOR AND SHIFT PULSE GENERATOR

Filed Aug. 11, 1967 3 Sheets-Sheet 1

Sept. 1, 1970 W. W. SANVILLE 3,526,843

PULSE WIDTH DISCRIMINATOR AND SHIFT PULSE GENERATOR

Filed Aug. 11, 1967 3 Sheets-Sheet 2

United States Patent Office 3,526,843

Patented Sept. 1, 1970

3,526,843

PULSE WIDTH DISCRIMINATOR AND SHIFT PULSE GENERATOR

Walter W. Sanville, Eastmont, Pa., assignor to Westinghouse Air Brake Company, Swissvale, Pa., a corporation of Pennsylvania Filed Aug. 11, 1967, Ser. No. 659,955
Int. Cl. H03k 9/00
U.S. Cl. 329—104 4 Claims

ABSTRACT OF THE DISCLOSURE

This invention relates to a pulse width discriminator and shift pulse generator system which assures flawless pulse width detection while simultaneously generating shift pulses when the system is supplied with a pulse train which has at least wide and narrow pulses indicative of coded information. The system includes a coded information pulse train source which provides a plurality of pulse trains delivered in a preselected fashion in accordance with the coding of wide and narrow pulse widths, at least one waveform of one of the pulse trains indicative of the above noted coded information. A pulse width discriminating circuit receives the plurality of pulse trains, and produces a data output signal which indicates the presence of a wide pulse in the pulse train indicative of coded information, each such indication occurring within the time length of one of the narrow pulses and the time length of one of the wide pulses. A shift pulse generator is also fed the plurality of pulse trains and is electrically coupled to the data output signal from the pulse width generator means. The shift pulse generator produces a shift pulse output each time there is a change in state in the pulse train indicative of the coded information simultaneously with the absence of wide pulse indication on the pulse width discriminator data output signal as well as everytime the pulse width discriminator data output signal begins indicating a wide pulse.

This invention relates to a pulse width discriminator and shift pulse generator system.

More specifically, this invention relates to a pulse width discriminator and shift pulse generator system which assures flawless pulse width detection while simultaneously generating shift pulses in a real time fashion within the time span of every pulse discerned when the system is supplied with a pulse train which has at least wide and narrow pulses indicative of coded information. The system includes a coded information pulse train source which provides a plurality of pulse trains delivered in a preselected fashion in accordance with the coding of wide and narrow pulse widths, at least one waveform of one of the pulse trains indicative of the above noted coded information. A pulse width discriminating circuit receives the plurality of pulse trains, and produces a data output signal consisting of a first and a second binary condition, the presence of the second binary condition indicative of the presence of a wide pulse in the pulse train indicative of coded information, each successive second binary condition occurring within the time length of one of the narrow pulses and the time length of one of the wide pulses. A shift pulse generator is also fed the plurality of pulse trains and is electrically coupled to the data output signal from the pulse width generator means. The shift pulse generator produces a shift pulse output each time there is a change in state in the pulse train indicative of coded information and simultaneously when the pulse width discriminator data output signal is in a first binary condition, as well as everytime the pulse width discriminator data output signal enters said second binary condition.

Today's press toward automation in the field of automatic instantaneous object identification has brought into existence technical problems that almost defy description. At one time in the recent past it was considered a feat of cognizable technical significance to quickly automatically identify objects or written characters on objects placed before an object identifying apparatus. Most of these apparatuses provided that once the object was precisely positioned an instantaneous reading would be made, which reading would be a one-shot proposition. By a one-shot proposition it is intended to convey the idea that the object to be identified would be viewed instantaneously as a whole, or if there was a scanning process involved, one complete scan had to do the job. Into this already demanding environment has emerged the desirability of identifying objects, for example, train cars moving at speeds that may exceed 80 miles an hour, and while the accomplishment of this technological feat has been done with a degree of success in a one-shot viewing approach as noted earlier, by the utilization of microwave techniques or by color coding of labels on a vehicle or object, the invariable element of doubt pervades every scheme that has at its core the theory that one fast look at an object going upward of 80 miles an hour is enough. In order that this doubt be removed we must go to the addition of a "second look" checked against the first. The problems of synchronization and timing created by the extremely high speeds involved have pressed solid state technology to its limit. To the problems of code detection and synchronization the invention to be described addresses itself and provides a flawless solution with all the simplicity of invention of the first order.

It is therefore an object of this invention to provide a system capable of pulse width detection and shift pulse generation, all functions of said system being accomplished in a real time basis.

It is another object of this invention to provide for the generation of a shift pulse at a point in time intermediate the length of time of a narrow pulse and the length of time for a wide pulse when the system is supplied with a pulse train wherein the narrow and wide pulses have coded significance.

Yet another object of this invention is to provide a system capable of pulse width detection and shift pulse generation in such a manner that related apparatus may utilize coded information contained in a pulse train fed to such system and which system is immune to errors that typically can arise due to propagation line delays in the code information experienced by the related apparatus aforementioned.

In the attainment of the foregoing objects the system includes a pulse train generating unit which derives wide and narrow pulses from the scanning of a medium in which a wide pulse generated thereby will have multiple coded significance, the pulse train generating unit having as many pulse train output signals as there are different wide pulses having coded significance. A second component of the system is a pulse width discriminating circuit which always produces a data output signal at a point in time intermediate the length of time for a narrow pulse and the length of time for a wide pulse, which data output signal appears only when wide pulses from the pulse train output signals are fed to the pulse width discriminating circuit. The pulse width discriminating circuit includes integrating circuits, the number of which are as many as wide pulses in said pulse train from the pulse generating unit have different coded significance. The integrating circuits are electrically serially coupled to level detecting circuits, each of said integrating and level detecting circuits being fed said pulse train outputs in a parallel manner. The level detecting circuits provide data output signals only when an integrating circuit has integrated a pulse from the pulse train which exceeds in length of time the predetermined time, which predetermined time is always greater than the length of time of a narrow pulse width. A shift pulse generator is respectively coupled to the pulse train generator unit to receive the pulse train output signals and to the pulse width discriminating circuit to receive the data output signals. The shift pulse generator produces a shift pulse output each time there is a change of state present in the pulse train output signals which coincides with a signal from the pulse width discriminator, as well as every time the pulse width discriminator circuit delivers the data output signals. The shift pulse generator includes a first gate for providing an output pulse either when the state of the data output signal from the pulse width discriminating circuit is coincident with the changing state of the pulses in the pulse train, or when the pulse width discriminating means produces the data output signal.

Other objects and advantages of the present invention will become apparent from the ensuing description of illustrative embodiments thereof, in the course of which reference is had to the accompanying drawings in which.

A description of the above embodiment will follow and then the novel features of the invention will be presented in the appended claims.

Figure 1:
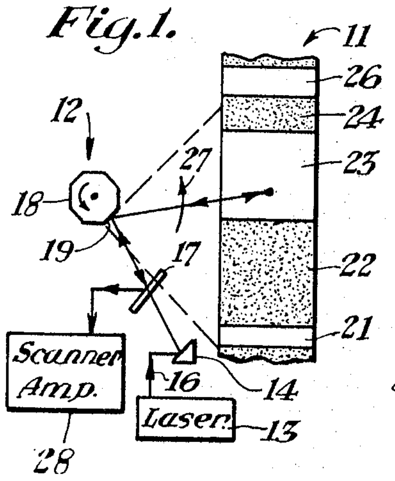
FIG. 1 illustrates in block diagram form the principal components of a data scanning system of the type in which the invention may be employed.

Reference is now made to FIG. 1 in which there is illustrated a typical scanning system which is designated by the reference numeral 12. This scanning system includes a laser light source 13 which delivers a beam of coherent light 16 to the surface of a prism 14, the reflected beam then passing through the center of a mirrored surface 17, the laser beam striking the face of a rotating multifaced mirror wheel 18. Specifically the mirrored face 19 of the multifaced mirror 18 rotates the beam that impinges upon each face to cause the beam to sweep across a medium which is to be identified, in this case a label 11. The label 11 is covered with retroreflective material in the spaces designated 21, 23 and 26. The alternate areas 22, 24 are black and do not reflect the light from the laser beam when they are swept across by the beam 16 as the beam moves in a path shown by the arrow 27. When the laser beam, as depicted here, is impinging upon the white area 23, the reflected light will pass back along the same path upon which it was delivered, striking the mirrored surface 19 and traveling back to the mirror 17, at which time the beam, due to diffusing action and the spreading brought about by the reflection from the label 11, causes this beam to be much larger relatively speaking on its return path than when it was delivered to the label 11. Accordingly, the opening through which the beam 16 passed on its way to the label 11 is small in comparison with the size and width of the reflected beam. This reflected beam of light then passes to a scanner amplifier 28. A detailed description of this system and the manner in which it operates is set forth in detail in my copending application for Letters Patent of the United States, Ser. No. 587,446, filed Oct. 18, 1966, for Laser Beam Scanner, and accordingly no further discussion will be made of the operation of this system. At this time it need only be pointed out that the label 11 carries coded information in the form of alternate black and white areas, which coded information in this instance has been selected to have binary significance.

It is in this type of environment that the invention to be described arises and finds its use. The problems that arise are set in an environment where the label 11 is affixed to moving vehicles, for example, trains, cars, or boxes, or objects which are moving relative to the scanner 12. These labels may pass the scanner at speeds upwards of 80 miles an hour. The scanner must therefore operate at a speed sufficient to cause the scanning beam 16 to pass over the label from bottom to top at least two times in order that subsequent logic may utilize the coded information and decode this coded information for ultimate use in the identification of the vehicle passing the scanner. Realizing the immense speed of the trains coupled with the speed of the scanner needed to make two complete sweeps of a label only six inches wide, as the labels are in this system, brings forth problems of coordinating the subsequent logic in a manner which will permit this logic to see and read bits of information detected from a label. In other words, because of the immense speeds involved there is a distinct problem which can arise where the logic which does the decoding may fail to see each of the bits of information which have been detected by the scanner and delivered by the scanner amplifier 28. While the scanner amplifier 28 depicted here does not have an output illustrated, it will be understood as FIG. 2 is reviewed that the scanner amplifier 28 is part of a scanner signal source and level detector designated in FIG. 2 by reference numeral 36.

Figure 2:
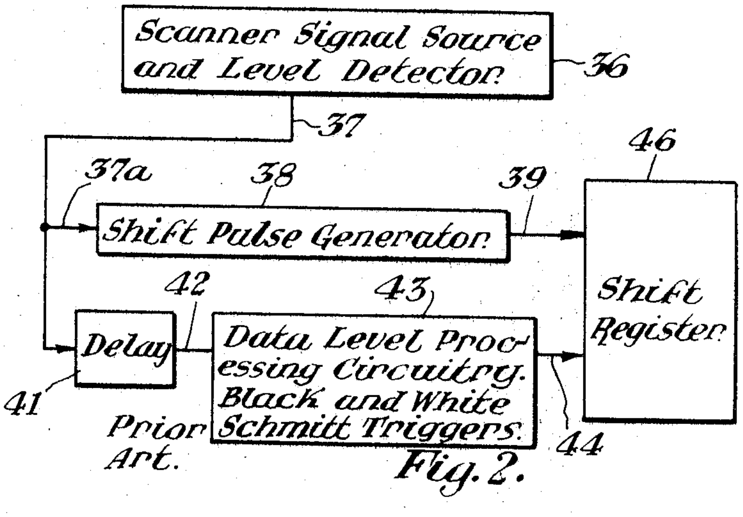
FIG. 2 depicts in block diagram form a typical prior art system that utilizes coded information derived by the scanner system of FIG. 1 and over which prior art systems the invention to be described is an improvement.

FIG. 2 illustrates the prior art approach to the utilization of the scanned information delivered by the scanner amplifier 28, as described with reference to FIG. 1. Accordingly, FIG. 2 illustrates a scanner signal source and level detector 36 which delivers an output over leads 37 and 37*a* to a shift pulse generator 38, which shift pulse generator utilizes the changing state of the coded information as presented by the scanner amplifier 28 incorporated in the scanner signal source 36 to develop a series of shift pulses to be delivered over an output 39 to a shift register 46. In the past in order that this information delivered from the scanner signal source and level detector 36 be faithfully recorded or stored in the shift register 46, there was added to the circuit between the scanner signal source 36 and a data level processing circuit 43 a delay circuit 41. This delay circuit would slow the coded information down sufficiently so that the output delivered from the delay circuit 41 over the lead 42 to the data level processing circuitry 43 would in turn cause the output pulse train on lead 44 to be delayed so that each time there was a shift pulse present from shift pulse generator 38 there would be a delayed data pulse appearing at the shift register at the same time. The data level processing circuitry includes Schmitt triggers (not shown) designated as black and white Schmitt triggers. Accordingly, in theory the simultaneous appearance of a shift pulse over the lead 39 to the shift pulse generator 38 to the shift register 46 at a time when a pulse was being delivered by the data level processing circuitry 43 over the lead 44 would accomplish the entrance or the admission of this bit of information into the shift register 46. In theory this delay coupled with shift pulses generated as the signal changed state would provide for a reading of the coded information delivered from the scanner amplifier as depicted in FIG. 1.

Figure 3:
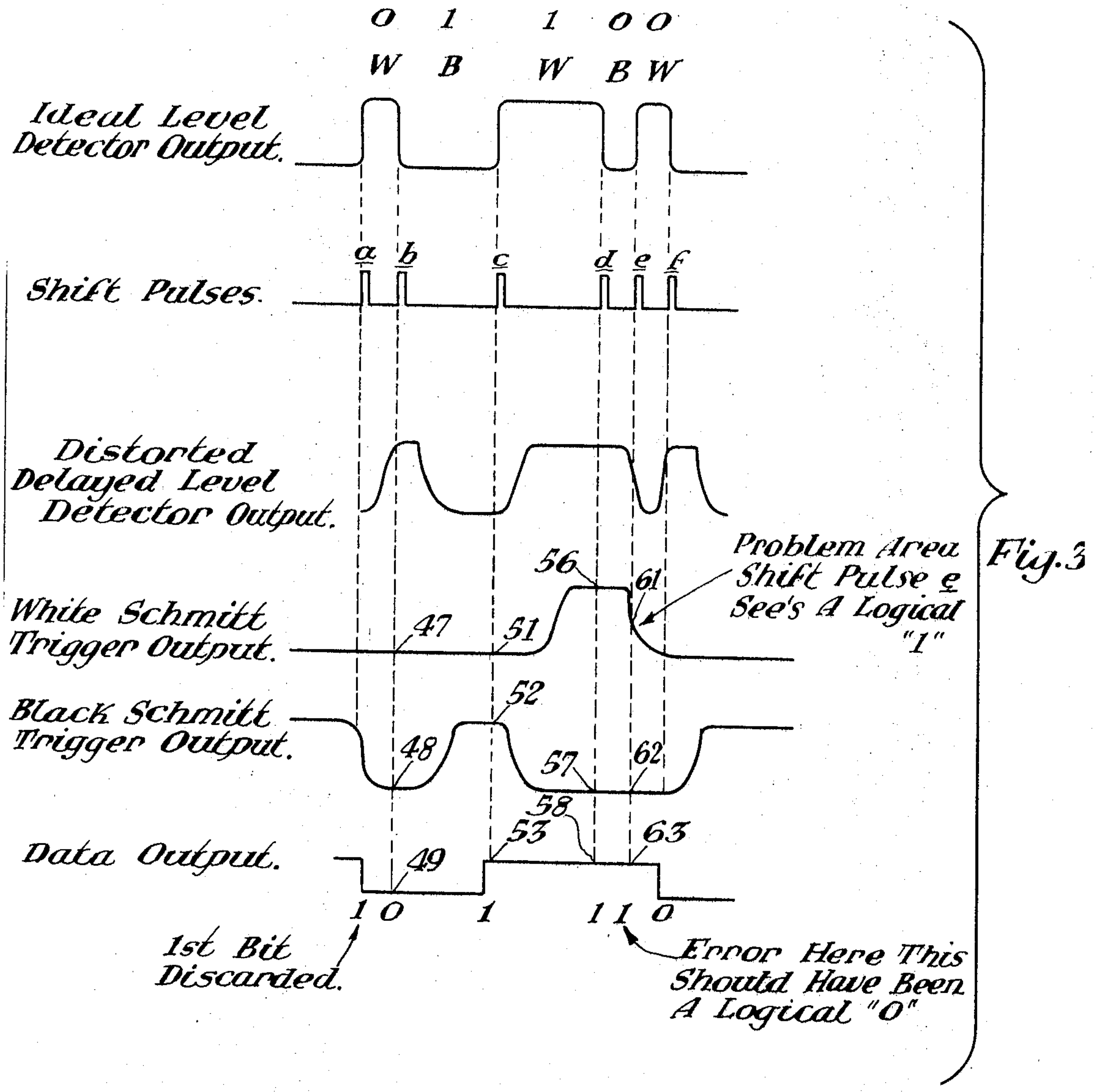
FIG. 3 is a timing chart of the operation of the system of FIG. 2.

Reference will now be made to FIG. 3 in which there has been illustrated a timing chart to show the output of the various components as they would appear in a real time basis, and it is contended that this illustration set forth in FIG. 3 will graphically point out the inherent problems that arise in an environment such as the type here under study.

At the top of FIG. 3 the characters 01100 appear and directly beneath them are the letters WBWBW in which W stands for a white area or region and B stands for a black area or region. In this instance the code format selected is one in which every alternate stripe scanned must be of a different color, either black or white. Accordingly, we will see when FIG. 1 is studied in conjunction with FIG. 3 that as the beam 16 from the laser 13 passes, as indicated by the arrow 27, over the face of the label 11, the beam will first contact and pass over a white area 21 which, as can be seen here, is narrow in contrast to the black stripe which succeeds it and is designated by reference numeral 22. As the beam sweeps over the black area 22, there will be no reflected laser light and accordingly the ideal level detector output which would appear on lead 37 from the scanner signal source and level detector 36 would present the shift pulse generator 38, as well as the delay circuit 41, with no signal during the period of time that the beam was passing over the area 22.

The next area encountered would be that of the white designated by reference numeral 23, and accordingly the pulsed output from the ideal level detector would be indicative of a wide white. In a similar fashion as the beam 16 from the laser source 13 passed over the areas designated 24 and 26 of the label 11, they would respectively produce no output when the black area 24 was being passed over while a small brief output indicative of a narrow stripe would appear when the beam passed over the white area 26.

For purposes of coding the information, as one looks at the ideal level detector output it becomes apparent that there is a binary code in which alternate stripes of white and black are so arranged that whenever a wide black or wide white appears it will be treated as a binary "1," while whenever there is a narrow white or a narrow black, this will be treated as a binary "0."

Accordingly, the next portion of the timing chart depicted in FIG. 3 is designated "Shift Pulses." The shift pulses are generated in conventional fashion and this is accomplished by detecting the change in state of each of the pulses as they appear on lead 37*a* from the scanner signal source and level detector 36. There will be noted a plurality of shift pulses *a*, *b*, *c*, *d*, *e* and *f*, each one appearing at the instant there is a change in state of the signal that is coming from the scanner signal source 36. Now, in order that the shift register 46 see each of the bits of information it is necessary that the shift pulse appear timewise within the duration of the pulse sought to be detected. Accordingly, when the signal carrying the coded information is delayed by the delay unit 41, which may be of a capacitive type, this delayed output takes on the appearance shown in the third line of the timing chart, referred to here as "Distorted Delayed Level Detector Output" and this would appear on the lead 42 entering the data and level processing circuitry 43 in which, while not depicted here, are at least two Schmitt triggers referred to generally as a black Schmitt trigger and a white Schmitt trigger, each of these designed to produce an output only when the appropriate pulse is passed thereto. Whenever a pulse appears that is black, and is of the appropriate time duration, the Schmitt trigger will produce an output. The narrow pulses because of their width will not provide a sufficient length of time to allow the signal level to arrive at a level sufficient to fire the Schmitt triggers. The next line of the timing chart is designated "White Schmitt Trigger Output." Viewing the entire chart as shown here, one will see that the narrow white that first appears and is on the first line of the timing chart will not allow sufficient time for the white Schmitt trigger to charge up and therefore fire. Accordingly, there will be no output appearing at the output side of the white Schmitt trigger when the narrow white stripe has been traversed by the scanning beam. Furthermore, there will only appear a pulsed output from the white Schmitt trigger unit of FIG. 2 when the wide white pulse is traversed by the scanning beam. This output is shown by the curve designated by reference numeral 56 during the time span shown here as delayed by the distorted delayed level detector output. By reason of design the first shift pulse *a* is not utilized due to the fact that the data has been delayed and the trailing edge of the first pulse is all that is needed to ensure the admission to the shift register 46.

It will then be appreciated that if the shift pulses of line 2 of this chart are studied in contrast to the pulsed output of the white Schmitt trigger, the second shift pulse *b* will appear in time at the shift register 46 at the same moment that the time designated by reference numeral 47 is present and this will allow the shift register to see a logical "0." Again, when shift pulse *c* arrives at the shift register 46 from the lead 39, there will be no output present on the lead 44, as is evidenced by the reference numeral 51 shown on the White Schmitt Trigger Output. But when shift pulse *d* appears timewise, this shift pulse *d* will appear at approximately the middle of the pulse designated by reference numeral 56 and therefore the shift register 46 will see its first logical "1."

Now the problem that confronts systems of this high speed nature will be seen by a study of the trailing edge of the pulse designated by reference numeral 56. As this pulse decays, as shown by reference numeral 61, there also appears in time the shift pulse *e* noted on the second line of this chart, and this shift pulse *e* will also see some voltage level on the trailing edge of the pulse 56, designated by reference numeral 61, and therefore the shift register will enter a binary "1." This of course is the center of the problem area to which the invention will address itself and provide a solution.

A study of the fifth line of the timing chart in which the "Black Schmitt Trigger Output" is graphically illustrated will, when compared to the pulse train that appears on the White Schmitt Trigger Output line, present a more complete picture of the system operation. As was noted earlier, when the shift pulse *b* appears on the lead 39 being fed to the shift register 46, there will be on the output lead 44 from the data level processing circuitry 43 a signal of the zero level and accordingly the points 47 and 48 on the two curves of the two Schmitt triggers coincide, in that both of these curves are at the zero state at this time. This, of course, would produce a data output as seen by the shift register of a logical "0," at the point designated by the reference numeral 49.

In a similar fashion at the point 51 beneath the shift pulse *c*, while there would be no output from the white Schmitt trigger, there would be an output present from the black Schmitt trigger designated by the reference numeral 52. This output from the black Schmitt trigger would occur during the wide black pulse which would have been produced by the blackened area 22 of the label 11. Therefore, with the shift pulse *c* appearing on the lead 39, the shift register would take into it the presence of the black Schmitt trigger output and therefore produce a logical "1" which would be evidenced by the reference numeral 53 on the last line of the timing chart.

It can also then be appreciated that at points 56 and 57 under shift pulse *d* the white Schmitt trigger output would be seen by the shift register 46 when the shift pulse *d* simultaneously appeared on the lead 39, and there would be an output having a binary significance of "1" as is designated by reference numeral 58 on the last line of the timing chart. The problem discussed earlier will now be shown to arise when shift pulse *e* appears and this shift pulse coincides with a portion of the trailing edge of the pulse from the white Schmitt trigger output designated 61. Accordingly, while there would be no output on the black Schmitt trigger at point 62, the shift register 46 would see the trailing edge at point 61, and therefore produce an indication in the data output record of a logical "1" as denoted by the reference numeral 63. When the shift pulse *f*, the last of the train here being described, appears, this would of course see only a zero level on both of the curves and a logical "0" as depicted in the last line of the timing chart would be indicated.

To the problems just described the subsequent figures and the description thereof will set forth a solution.

Figure 4:
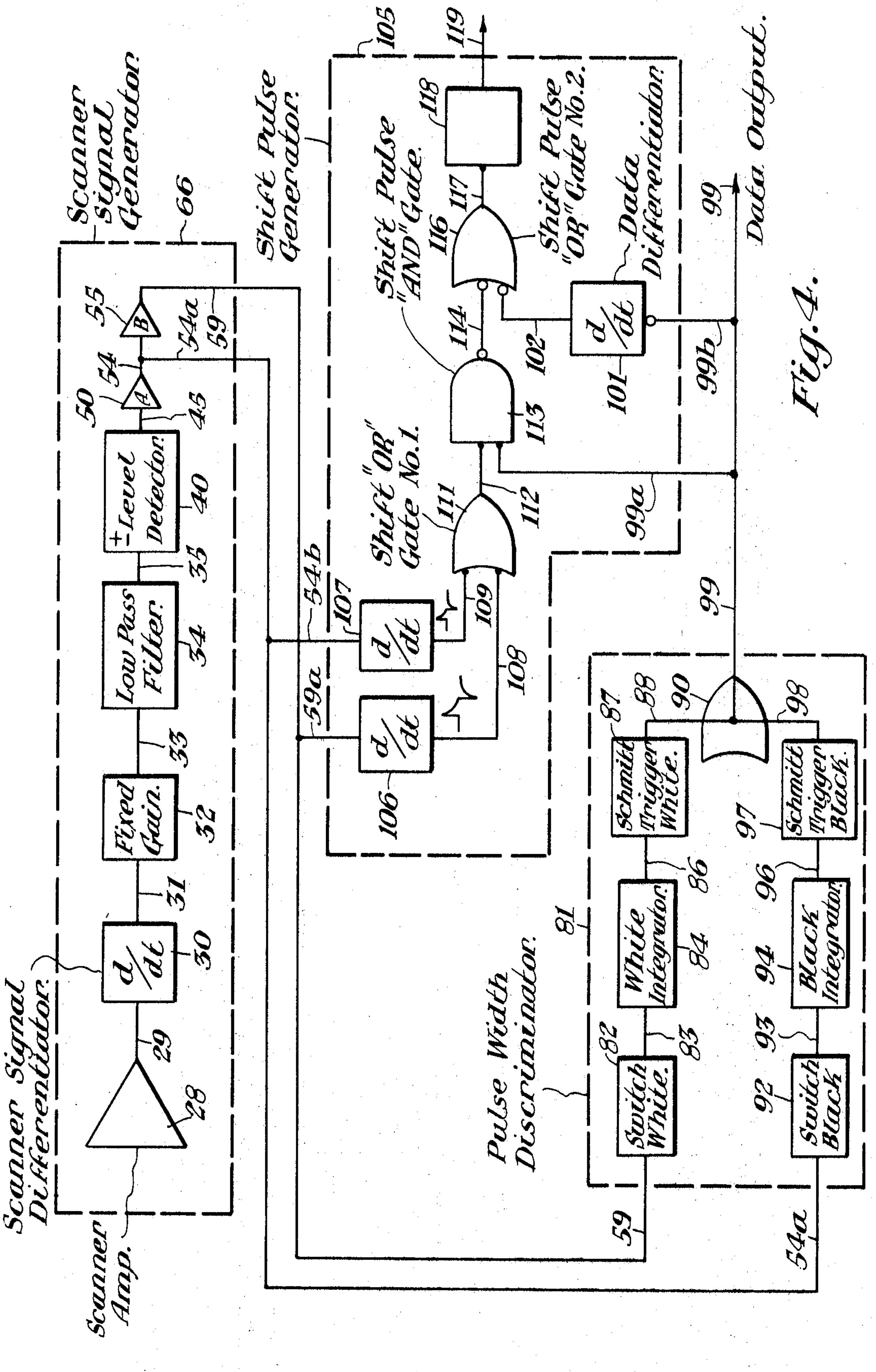
FIG. 4 illustrates a preferred embodiment of the invention.
Figure 5:
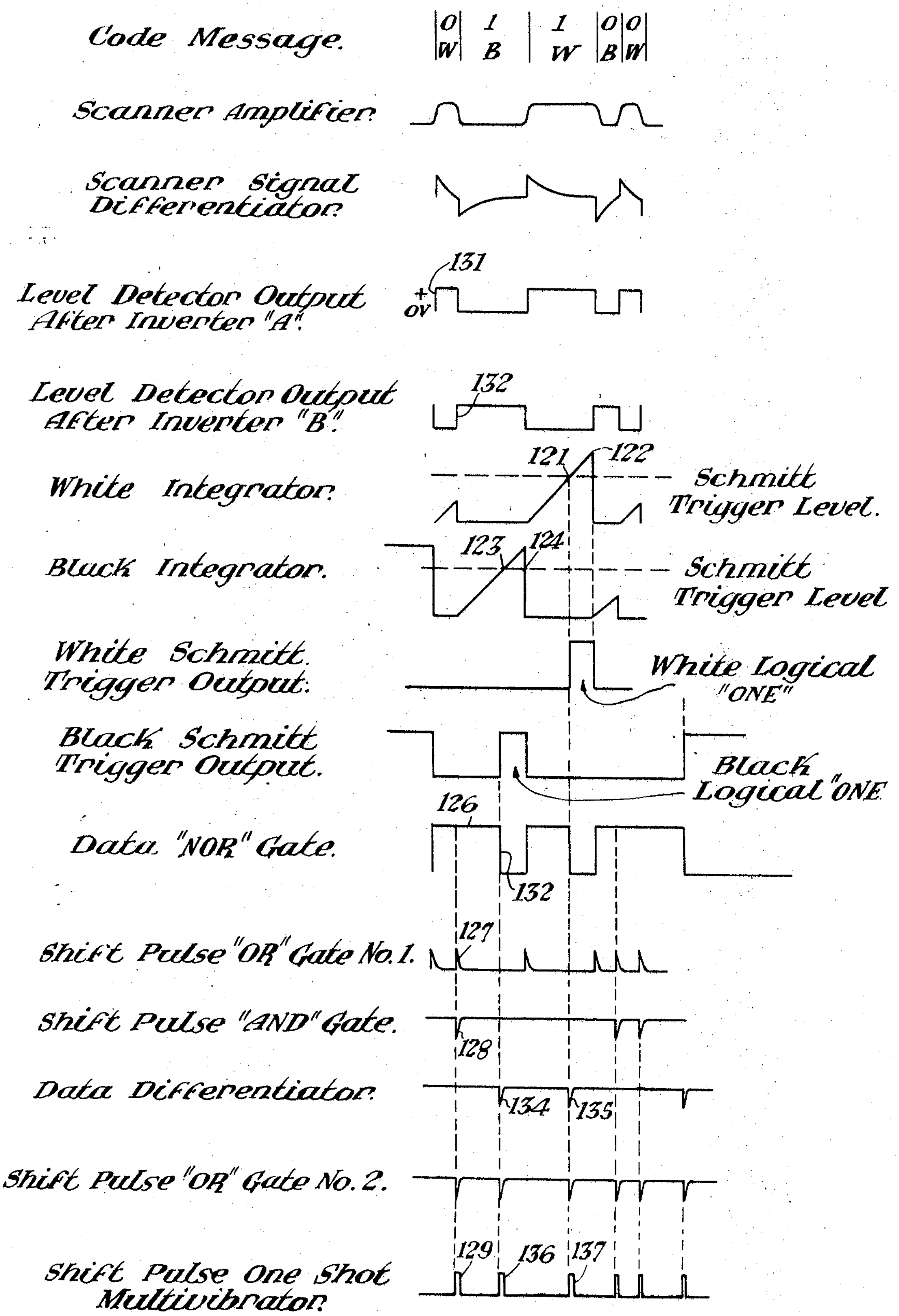
FIG. 5 is a timing chart of the operation of FIG. 4.

Reference is now made to FIG. 4. FIG. 4 will be studied in conjunction with FIG. 5, FIG. 5 being a timing diagram indicative of the different pulse shapes and conditions as the coded message set forth in the upper portion of FIG. 3, as well as the upper portion of FIG. 5, is processed through the system set forth in FIG. 4. This contrast between the operation of the prior art arrangements and the problems that arose therein will graphically set forth applicant's contribution in this very difficult area of synchronization of shift pulses and data with reference to high speed systems of the type being discussed here.

FIG. 4 sets forth three basic components, one referred to as a scanner signal generator 66, which in turn feeds information simultaneously to a shift pulse generator 105, as well as a pulse width discriminator 81. The scanner signal generator contains a scanner amplifier 28. This scanner amplifier 28 is the same scanner amplifier set forth in FIG. 1 and provides the very same function noted with reference to the discussion of FIG. 1. Accordingly, the scanner amplifier 28 provides a pulse train output of the type depicted in the second line of FIG. 5 where it is designated "Scanner Amplifier." This scanner amplifier output in turn is fed by a lead 29 to a scanner signal differentiator 30, which scanner signal differentator 30 provides the pulse train output shown on the third line of FIG. 5. It will be appreciated that at each point where there has been a change in state the differentiator produces a curve of the type depicted in FIG. 5. This scanner signal differentiator, as well as the differentiators to be noted hereafter, may be of a conventional type providing the typical wave form seen here in the third line of FIG. 5. Once a signal has been differentiated it is passed over the lead 31 to a fixed gain amplifier 32 and then on by lead 33 to a low pass filter 34. The operation of the low pass filter and the fixed gain amplifier are of course conventional and do not form a part of the instant invention.

The signal after it has been processed by the low pass filter enters the plus-minus level detector 40, having traveled over the lead 35. Once the signal has entered the level detector, this level detector which may be of a conventional design will put out a pulse train of the type depicted in the fourth line of FIG. 5. Of course the forth line of FIG. 5 sets forth the signal in its inverted form after it has left the level detector over the lead 35 and past inverter 50 to the lead 54. Accordingly, the output depicted on line 4 of FIG. 5 is that output which appear on the lead 54 and consequently on the electrical leads 54*a* and 54*b* as these leads feed this information simultaneously to the shift pulse generator 105 as well as the pulse width discriminator 81.

The signal that is present on the electrical lead 54 is inverted by the inverter 55 and passes by the leads 59 and 59*a* to the shift pulse generator 105 as well as the pulse width discriminator 81. The pulse train on line 5 of FIG. 5 depicts the conditions instantaneously present in a real time fashion as they appear on electrical lead 59 just noted.

The first major study to be made of the three system components set forth here in FIG. 4 will be that of the pulse width discriminator 81, which pulse width discriminator contains a pair of parallel circuits, each of these circuits containing respectively a unit referred to as a white switch 82 and a black switch 92. The white switch 82 is in a normally open condition and passes the pulse train that appears on lead 59 through to a white integrator unit 84 over the lead 83 and hence on to the Schmitt trigger 87 via the lead 86 and thence to an OR gate 90 over the lead 88 whereupon the signal delivered from the Schmitt trigger 87 over the lead 88 through the OR gate 90 will be passed to the lead 99 and thence will be treated as a data output when, for reasons that will be explained hereafter, a pulse has appeared from the Schmitt trigger 87 over the lead 88 through the OR gate 90. This signal from the Schmitt trigger 87 and its cooperation with the components within the shift pulse generator 105 will be explained in more detail hereafter.

As was noted, the pulse width discriminator 81 also contains a black switch fed by the electrical lead 54*a* which has received the coded information from the level detector as inverted by the inverter 50 and passed over leads 54 and 54*a*. The black switch 92, which is also normally open, passes the pulse train that appears on line 5 of FIG. 5 through the black integrating unit 94, as delivered by the lead 93, and is then passed to the black integrator 94, which integrating unit provides the conventional integrating function of the signal processed thereby. The output from the black integrator appears on electrical lead 96 and thence is delivered to the black Schmitt trigger 97, the output of which is delivered over electrical lead 98 to the OR gate 90 and then to the output lead 99 from pulse width discriminator 81.

The operation of the various components of the pulse width discriminator 81 will be made evident by a study of the pulse forms as they are processed by the various components within the pulse width discriminator, and as they are depicted in FIG. 5. For example, when a pulse train of the type depicted on line 4, FIG. 5, is delivered to the white integrator, the integrator will attempt to inegrate the signal over the period of time presened by each pulse. It will therefore be appreciated that as a study of line 6 is made, during the period of the white pulse, which is shown on lines 1 and 2, the integrator would charge up not quite to a level sufficient to power the Schmitt trigger shown by the dash line and labelled as such in FIG. 5, line 6.

As the wide white stripe is encountered, which, in this instance if reference was made to FIG. 1, would be the stripe 23, this wide white stripe would cause the white integrator 84 to integrate the signal over the period of time, the length of which would be the length of the wide white stripe. When the integrator output level reached a point designated as 121, this would fire the Schmitt trigger which is coupled to the white integrator 84 via lead 86. Quite obviously the Schmitt trigger would remain fired for the period of time designated by the reference numeral 121 to the time designated by the reference numeral 122, at which time the output from the Schmitt trigger would drop to zero, stay at zero over the width of the black pulse which in this case was black stripe 24, shown in FIG. 1, and thence as it encountered the last white stripe, which would be 26 of FIG. 1, this pulse would start rising again but of course not reach the Schmitt trigger level.

It will therefore be appreciated that the white Schmitt trigger and its output will appear as shown on line 8 of the timing chart, where there is but a single pulse depicted indicative of the white logical "1." Of significance is the fact that the leading edge of the logical "1" of the white Schmitt trigger appeared intermediate the length in real time of the white pulse detected and amplified by the scanner amplifier. This aspect is quite important to the subsequent generation of a shift pulse at the appropriate time within the span of time for the wide white pulse.

When the output from inverter 55 of the scanner signal generator 66 is studied, it will be seen that the black switch as well as the black integrator circuit 94 and black Schmitt trigger 97 will function in a manner quite analogous to that described with reference to the white integrator output and the white Schmitt trigger ouput. Accordingly, when the black integrator, as shown on line 7 of FIG. 5, is "on" at the start, it will then, as the first white narrow zero is processed and delivered by the scanner amplifier 28, drop to zero and remain so for the time span covered by the duration of the white narrow pulse, in this case the white narrow pulse created by the stripe 21 shown in FIG. 1. At the beginning of the black wide pulse produced by the scanner amplifier and brought about by the presence of wide black stripe 23 in FIG. 1, the black integrator 94 will charge at a rate which at the point designated by reference numeral 123 will fire the black Schmitt trigger 97, the black Schmitt trigger staying fired until the time designated by the reference numeral 124, as is found on line 7 of the timing chart of FIG. 5. Upon the passage of the black wide pulse the signal level will drop to zero and remain so over the white wide pulse and then it will proceed to charge up again as the black narrow pulse is encountered but of course not reach the Schmitt trigger level.

We can, therefore, appreciate the appearance of the pulse pattern that appears on line 9, as well as line 8. There appears on line 8 a single pulse, the leading edge of which is intermediate the width of the white wide pulse and in a similar fashion the pulse that appears on line 9 is indicative of a black logical "1," the leading edge of this pulse appearing intermediate the length in time of the black wide pulse. At this point in time we can appreciate the fact that there are no narrow pulses brought about by the passage of a scanner beam over a narrow stripe which lasts for sufficient time to fire the Schmitt trigger indicative of either a white pulse or a black pulse as seen by the scanner. It is this important aspect of the pulse width discriminator that lends itself to coact with the shift pulse generator 105 to produce the shift pulses in appropriate time sequence in a manner now to be described, which proper sequence will guarantee the generation of shift pulses at every change in state of the coded message as well as at a point intermediate the length of time of a narrow pulse and a wide pulse, and it will be done in the following fashion.

The output from the NOR gate 90 is shown on line 10 of FIG. 5 and quite logically follows the pattern established by the presence of the pulses appearing on lines 8 and 9 of FIG. 5, the gate 90 in this instance being a NOR gate. In other words, the output from the NOR gate 90 is present whenever there is not a signal delivered to the NOR gate 90, and accordingly when the pulses depicted on lines 8 and 9 of FIG. 5 are present, the output from the data NOR gate will fall to zero during the duration of each of these pulses.

Turning now to the outputs that are delivered from the scanner signal generator 66. As noted earlier, these two pulse trains are depicted by the pulses on lines 4 and 5, respectively, of the timing chart of FIG. 5. These pulse trains of lines 4 and 5 will be differentiated by differentiators 106 and 107 after they have been delivered to these differentiators 106 and 107 by leads 54, **54*a*, 54*b*, 59 and 59*a*, respectively. The differentiators 106 and 107 functioning in a conventional fashion and of a conventional design will provide a pulse train of a type similar to the scanner signal differentiator output depicted in line 3 of FIG. 5. The pulse train has not been depicted in the timing chart but it will be appreciated that these are spiked pulses of a similar type and the appearance of these spiked pulses will cause, whenever the spiked pulse is a positive going pulse, an output to appear on the output lead of shift NOR gate No. 1, designated by reference numeral 111. Accordingly, when there is a spiked positive going pulse on lead 108 from the differentiator 106, as well as on lead 109 from differentiator 107, there will be an output on electrical lead 112, which electrical lead is coupled in turn to the shift pulse AND gate 113. The shift pulse AND gate functioning as a conventional AND gate will only pass a signal when there is a signal present both on the lead 112 from the shift OR gate No. 1 and there is a similar pulse on the electrical lead 99*a* from the data NOR gate 90**. This condition will arise in the following manner.

It can be appreciated after making a study of the pulse trains on lines 4 and 5 of FIG. 5 that each time the trailing edge of the pulse is heading in a positive going direction there will be a pulse passed by the shift pulse OR gate No. 1, and accordingly there will appear a pulse train on the electrical lead 112 leading from the shift OR gate No. 1, this being depicted on line 11 of the timing chart of FIG. 5. Accordingly, there are shown here six pulses on line 11 of FIG. 5. The only time that the AND gate 113 is going to pass a signal will be when these positive going pulses from the shift OR gate No. 1 coincide with the positive state in the data output from the pulse width discriminator 81, as it appears on lead 99 from the shift NOR gate 90. Therefore, when the data NOR gate 90 output is positive, as depicted at reference numeral 126, and the second shift pulse on line 11 is also positive, as shown by reference numeral 127, the shift pulse AND gate 113 will have an output designated on line 12 of the timing chart by reference numeral 128.

It will be appreciated that the first shift pulse that appeared on line 11 of the timing chart of FIG. 5 would appear timewise at the same instant that the data NOR gate was going positive and therefore would not provide the simultaneous quality of signal level necessary at the AND gate. Accordingly, this first shift pulse would provide no effect to the ultimate shift pulse generation. It was just noted that when the two conditions designated by the reference numerals 126 and 127 on lines 10 and 11, respectively, of the timing chart are present, there will be an output from the shift pulse AND gate, as shown by reference numeral 128. This pulse will appear on electrical lead 114 and this will cause the shift pulse OR gate No. 2, designated by the reference numeral 116, to pass a signal over the lead 117 to a one-shot multivibrator 118 which will actually produce the ultimate shift pulse for use in the system to which the invention is to be employed. This shift pulse will appear on lead 119 as it emanates from the one-shot multivibrator 118 and the shift pulse generator 105. This shift pulse is designated 129 and comes from the one-shot multivibrator as indicated on line 15 of the timing chart of FIG. 5.

At this point in time it may be well to review some basic facts with regard to the functioning of the shift pulse generator 105. As noted earlier, there is delivered from the scanner signal generator 66 two pulse trains delivered via electrical leads **59*a* and 54*b*. Each of these pulse trains is respectively the one depicted on lines 4 and 5 of FIG. 5, and of course it should be noted that the leading edge of the first pulse appearing on line 4, designated by reference numeral 31, is that portion of the pulse which when differentiated will produce a spiked output from the differentiator 106, which output delivered over electrical lead 108 to the shift OR gate No. 1 will produce an output. In a similar fashion on line 5 of the timing chart of FIG. 5 the trailing edge of the first pulse which is a positive going pulse is that portion of the pulse which when differentiated will produce an output which the shift OR gate No. 1 will respond to, and accordingly when this portion of the positive going trailing edge of the first pulse is present there will be an output from the shift OR gate No. 1. The shift OR gate No. 1 therefore responds only to positive going signals as does the shift pulse AND gate 113. As noted, when there is both an output on the lead 112 as well as the lead 99*a*, there will be an output from the shift pulse AND gate 113 which will be delivered over the lead 114 to the OR gate 116 which in turn will be passed over lead 117 to the one-shot multivibrator 118** to produce a shift pulse as described earlier.

There is another situation in which a shift pulse will be generated. This is a very important shift pulse because it is that shift pulse which will be utilized to determine the presence of wide black stripes or wide white stripes. In the bottom portion of the shift pulse generator 105 there is depicted a data differentiator 101 electrically connected to the output of the pulse width discriminator 81 via the leads 99 and **99*b*. This data differentiator receives the same signals that the shift pulse AND gate 113 received, but this data differentiator is designed to respond only to the negative going edge of any signal delivered thereto. This condition is indicated by the presence of a small circle or bubble which is present in contact with the data differentiator 101 and the electrical lead 99***b*. Therefore, when a study is made of the output from the data NOR gate 90, which is represented on line 10 of FIG. 5, it will be seen that the reference numeral 133 indicates there is a negative going portion of this pulse which the data differentiator 101 will see and which when it does arrive will produce the data differentiator output shown on line 113, which in turn will be delivered to the shift pulse OR gate No. 2, this data differentiator output appearing each and every time there is a change in the negative going direction to the output from the NOR gate 90. When this output appears, as designated by the reference numerals 134 and 135, there will of course be passed by the shift pulse OR gate No. 2 a pulse over the lead 117 to the one-shot multivibrator 118, which in turn will produce respectively the two pulses 136 and 137, shown on line 15 of FIG. 5. These shift pulses have been generated therefore in time at a point intermediate the length in time of any wide pulse detected, in this case, the wide black and the wide white.

It should also be appreciated that since these shift pulses 136 and 137 are generated within the time span of the pulse to be discerned by the subsequent equipment of the type shown in FIG. 2 and designated as a shift register 46, this shift pulse pattern shown here as 136 and 137 will guarantee that the wide pulses are always detected at some point within the middle of the wide pulse or intermediate the end of the wide pulse, and there is no possibility that any one bit of information may be read twice or seen twice because of the presence of the shift pulses generated. Therefore, it will be readily noted that this shift pulse generator and pulse width discriminator produce a series of shift pulses every time there is a change in state of the pulse train which is derived from scanning a medium which produces pulses of different widths, as well as each time a pulse of a predetermined width wider than the narrow width is detected and the shift pulse generated during the wide pulse width detected will always fall within the wide pulse being discerned.

It is therefore readily evident that the system which has just been described provides for the flawless presentation of shift pulses in a real time fashion without the need for delays to provide for the absolute assurance of pulse width detection and pulse width identification by subsequent components of the system, and therefore represents a significant advance in the art.

While the present invention has been illustrated and disclosed in connection with the details of illustrative embodiments thereof, it should be understood that those are not intended to be limitative of the invention as set forth in the accompanying claims.

Having thus described my invention, what I claim is:

1. A pulse width discriminator and shift pulse generator system which assures flawless pulse width detection of a coded information pulse train having at least narrow and wide pulse widths indicative of coded information, while simultaneously generating shift pulses in a real time fashion, said system comprising (a) a coded information pulse train source providing a plurality of pulse trains delivered in a preselected fashion in accordance with the coding of wide and narrow pulse widths, at least one waveform of one of said pulse trains indicative of said coded information, (b) a pulse width discriminating means which receives said plurality of pulse trains, said pulse width discriminating means determining the coded significance of said wide and narrow pulses and having a data output signal consisting of a first and a second binary condition, the presence of said second binary condition being indicative of the presence of a wide pulse in said at least one pulse train indicative of said coded information and each successive one of said second binary conditions occurring within the time length of one of said narrow pulses and the time length of one of said wide pulses, (c) a shift pulse generator means electrically coupled to said coded information pulse train source and fed said plurality of pulse trains, said pulse width discriminating means data output signal electrically coupled to said pulse width generator means, said shift pulse generator means producing a shift pulse each time there is a change in state in said at least one pulse train indicative of said coded information and simultaneously when said pulse width discriminator means output signal is in said first binary condition, said shift pulse generator means also producing a shift pulse whenever said pulse width discriminating means data output signal enters said second binary condition, said pulse width discriminating means and shift pulse generator system thereby providing said data output signal indicative of said wide pulses and said shift pulse output, said outputs appearing in a real time fashion for use by related components to said system which will utilize said coded information in said pulse train.

2. The system of claim 1 wherein said pulse width discriminating means has at least one integrating means electrically coupled to a level detecting means, said level detecting means providing said data output signal only when said integrating means has integrated a pulse from one of said plurality of said pulse trains which exceeds in length of time a predetermined time which predetermined time is always greater than the length of time of a narrow pulse width.

3. The system of claim 2 wherein said coded information pulse train source derives its wide and narrow pulses from the scanning of a medium in which a wide pulse generated thereby will have multiple coded significance.

4. The system of claim 3 wherein said pulse width discriminating means has as many integrating means as wide pulses in said pulse train from said pulse generating means have different coded significance, said integrating means electrically serially coupled to level detecting means, each of said integrating and level detecting means being fed one of said plurality of pulse trains from said coded information pulse train source in a parallel manner, said level detecting means providing discrete data output signals only when an integrating means has integrated a pulse from one of said plurality of pulse trains which exceeds in length of time said predetermined time which predetermined time is always greater than said length of time of a narrow pulse width.

References Cited

UNITED STATES PATENTS 3,207,928 9/1965 Van Duzer ------ 307—234 X

ROY LAKE, Primary Examiner

L. J. DAHL, Assistant Examiner

U.S. Cl. X.R.

329—106